(12) United States Patent
Gomes et al.

(10) Patent No.: US 11,564,130 B2
(45) Date of Patent: Jan. 24, 2023

(54) RADIO ACCESS TECHNOLOGY AWARE CELLULAR NETWORK INTER-FREQUENCY COVERAGE ORCHESTRATOR

(71) Applicant: Telefonaktiebolaget LM Ericsson (publ), Stockholm (SE)

(72) Inventors: Eugene Gomes, Plano, TX (US); Xin Li, Allen, TX (US); Mahmood Osorio, Rockwall, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 27 days.

(21) Appl. No.: 17/180,650

(22) Filed: Feb. 19, 2021

(65) Prior Publication Data

US 2021/0258833 A1    Aug. 19, 2021

Related U.S. Application Data

(60) Provisional application No. 62/978,733, filed on Feb. 19, 2020.

(51) Int. Cl.
*H04W 28/18*    (2009.01)
*H04W 16/28*    (2009.01)

(52) U.S. Cl.
CPC .......... *H04W 28/18* (2013.01); *H04W 16/28* (2013.01)

(58) Field of Classification Search
CPC ..... H04W 28/18; H04W 16/28; H04W 16/14; H04B 7/0491
See application file for complete search history.

(56) References Cited

U.S. PATENT DOCUMENTS

| | | | |
|---|---|---|---|
| 6,104,936 A * | 8/2000 | Kronestedt | H04W 16/28 342/359 |
| 10,798,630 B1 * | 10/2020 | Azem | H04W 36/24 |
| 11,051,184 B1 * | 6/2021 | Ami | H04W 24/02 |
| 2006/0068849 A1 * | 3/2006 | Bernhard | H04W 16/28 455/562.1 |
| 2007/0021151 A1 * | 1/2007 | Mori | H04W 16/28 455/562.1 |
| 2010/0075682 A1 * | 3/2010 | del Rio-Romero | H04W 16/08 455/439 |

(Continued)

*Primary Examiner* — Ivan O Latorre
(74) *Attorney, Agent, or Firm* — Nicholson De Vos Webster & Elliott LLP

(57) ABSTRACT

A method at a network node for compensating for inter-frequency coverage disparity between multiple cells operating across a coverage area of a wireless communications network. The method determines a disparity in signal coverage over the coverage area between a first cell and a second cell, wherein the first cell operates at a different frequency spectrum or frequency band from the second cell and wherein the network node determines the disparity in signal coverage by analyzing network data collected for the first and second cells. The method determines when the disparity in signal coverage meets a set criterion; and when the disparity in signal coverage meets the set criterion, adjusting coverage shape of one of the first cell and the second cell over the coverage area to reduce the disparity, wherein the adjusting of the coverage shape is performed by tilting signal coverage of the antenna at the transmission point.

20 Claims, 10 Drawing Sheets

(56) References Cited

U.S. PATENT DOCUMENTS

| | | | |
|---|---|---|---|
| 2010/0311353 A1* | 12/2010 | Teillet | H03F 3/24 |
| | | | 455/84 |
| 2011/0069633 A1* | 3/2011 | Schmidt | H04L 25/03343 |
| | | | 343/893 |
| 2011/0070908 A1* | 3/2011 | Garcia Cabezas | H04W 16/28 |
| | | | 455/507 |
| 2011/0281526 A1* | 11/2011 | Matsuda | H04B 17/3913 |
| | | | 455/67.11 |
| 2012/0184280 A1* | 7/2012 | Hunukumbure | H04W 24/02 |
| | | | 455/446 |
| 2012/0320766 A1* | 12/2012 | Sridhar | H04W 52/0206 |
| | | | 370/252 |
| 2013/0021204 A1* | 1/2013 | Walker | H04W 16/28 |
| | | | 342/372 |
| 2013/0142183 A1* | 6/2013 | Lee | H04W 72/08 |
| | | | 455/517 |
| 2015/0173086 A1* | 6/2015 | Karaman | H04W 16/10 |
| | | | 370/254 |
| 2015/0271684 A1* | 9/2015 | Park | H01Q 3/00 |
| | | | 455/452.1 |
| 2016/0157126 A1* | 6/2016 | Nuss | H04W 16/22 |
| | | | 370/230 |
| 2016/0211576 A1* | 7/2016 | Vassilakis | H01Q 1/1228 |
| 2019/0140908 A1* | 5/2019 | Ma | H04L 41/5058 |
| 2019/0373495 A1* | 12/2019 | Ouyang | H04W 16/28 |
| 2019/0380046 A1* | 12/2019 | Johnson | H04W 24/02 |
| 2020/0154285 A1* | 5/2020 | Sturgeon | H04W 16/28 |
| 2021/0227403 A1* | 7/2021 | Tsui | H04W 24/08 |
| 2021/0258833 A1* | 8/2021 | Gomes | H04W 16/14 |

* cited by examiner

RADIO ACCESS TECHNOLOGY AWARE CELLULAR NETWORK INTER-FREQUENCY COVERAGE ORCHESTRATOR

CROSS-REFERENCE TO RELATED APPLICATIONS

This application claims the benefit of U.S. Provisional Application No. 62/978,733 filed Feb. 19, 2020, which is hereby incorporated by reference.

TECHNICAL FIELD

Embodiments of the disclosure relate to the field of wireless communication; and more specifically, to disparity in coverage between two or more co-located cells in a coverage area.

BACKGROUND ART

In early cellular networks, a spatial area serviced by a cell tower generally contained several coverage areas commonly referred to as cells or sectors. A number of individual sectors circumscribed the cell tower to provide wireless radio coverage. A particular radio access technology serviced the sector in providing communications services to mobile devices, typically referred to as user equipment (UE). However, in many of these instances, a single cell provided coverage over a particular coverage area (e.g., sector). Therefore, ensuring adequate signal coverage over a given sector involved sampling signal strength at various locations about a cell tower and making fixed electrical or physical adjustments pertaining to the cell tower or signals being transmitted from the cell tower.

However, as technology evolved, spatial areas are now covered by more than one cell. Whether by spatial diversity or frequency diversity, a given sector can be in signal coverage by more than one cell. For example, with carrier aggregation, a UE may receive multiple carriers at a given location, where each carrier can be sent via different cells. The transmitting point for the different carriers can be the same cell tower or different cell towers. Having more than one cell in a coverage area poses additional concerns in attempting to maintain good signal coverage for all the cells present in the coverage area.

Today, the version of radio access technology currently in prevalent use under the $3^{rd}$ Generation Partnership Project (3GPP) is the 3GPP Long Term Evolution (LTE), or Fourth Generation (4G), radio access technology. However, a newer radio access technology now being deployed is the Next Generation Mobile Networks Alliance for the 5th generation of mobile telecommunications standards (e.g., 5G), which is also referred to as New Radio (NR). The 5G/NR access technologies employ much higher frequency spectrum or bands than LTE, which limits the range of signal transmission. When a transmission point, such as a cell tower, transmits both LTE signals and 5G/NR signals, there could a significant disparity of signal strength and/or coverage between the cell from LTE and the cell for 5G/NR.

One solution is to attempt to improve coverage via radio frequency shaping using remote electrical tilt device optimization. These are typically based on a policy driven architecture and identify areas of poor cellular coverage. To adjust a single cell, a remote electrical tilt device is up tilted to assist with improvement of the identified poor coverage area. In a similar way, detected areas with sector overshooting or interference issues are fixed by down tilting the appropriate remote electrical tilt device.

However, as noted above, when cellular networks become more complex, there may be a multitude of different frequency layers or carriers, multiple different radio access technologies and/or different cell types, making the network more heterogeneous. With the addition of any new radio access technology (such as 5G/NR), there is the need for an improved technique to support a network. Under such circumstances, radio frequency shaping becomes more challenging. There is also a need for existing systems to become new radio access technology aware as deployment of 5G/NR radio access technology expands. Also, the policies surrounding the handling of network coverage need to take into consideration the cellular coverage of the support nodes and the new radio access technology in the decision-making process.

SUMMARY OF THE INVENTION

Certain aspects of the present disclosure and their embodiments may provide solutions to challenges noted above. The disclosure is related to cellular self-organizing networks detection and automation. It combines intelligence gathered from the network with network topology to maximize the coverage for both new radio access technology deployments and existing radio access network infrastructure. The disclosure pertains to planned or existing new radio access technology spectrum and planned or existing support bands.

The disclosure also pertains to a radio access technology aware cellular network inter-frequency coverage orchestrator that is able to use intelligence gathered from the network, network topology and site data, to auto-detect the maximum coverage distance of an underlay or overlay cell per sector, set the coverage improvement strategy for the remaining cells in the same sector and provide the opportunity for a self-organizing platform to improve the coverage of mismatched coverage parity sectors. In addition, it can apply a different optimization policy to cells or spectrum allocated to the new radio access technology and to support existing technology sector(s). The solution is also able to auto-adapt to network changes such as network site growth or cell expansions.

In one aspect of the disclosed system, a method at a network node provides for compensating for inter-frequency coverage disparity between multiple cells operating across a coverage area of a wireless communications network by performing coverage shaping via an antenna at a transmission point. The method further provides for determining a disparity in signal coverage over the coverage area between a first cell and a second cell, the first cell and the second cell operating over the coverage area, wherein the first cell operates at a different frequency spectrum or frequency band from the second cell and wherein the network node determines the disparity in signal coverage by analyzing network data collected for the first and second cells. The method further provides for determining when the disparity in signal coverage meets a set criterion; and when the disparity in signal coverage meets the set criterion, adjusting coverage shape of one of the first cell and the second cell over the coverage area to reduce the disparity, wherein the adjusting of the coverage shape is performed by tilting signal coverage of the antenna at the transmission point.

In a second aspect of the disclosed system, a network node provides to compensate for inter-frequency coverage disparity between multiple cells operating across a coverage area of a wireless communications network by performing coverage shaping via an antenna at a transmission point. The network node, having a processor and memory with instructions, provides to determine a disparity in signal coverage over the coverage area between a first cell and a second cell, the first cell and the second cell operating over the coverage area, wherein the first cell operates at a different frequency spectrum or frequency band from the second cell and wherein the network node determines the disparity in signal coverage by analyzing network data collected for the first and second cells. The network node further determines when the disparity in signal coverage meets a set criterion; and when the disparity in signal coverage meets the set criterion, to adjust coverage shape of one of the first cell and the second cell over the coverage area to reduce the disparity, wherein to adjust the coverage shape is performed by tilting signal coverage of the antenna at the transmission point.

In a third aspect of the disclosed system, a computer program comprising instructions, when executed by a processor, are capable of causing a network node to compensate for inter-frequency coverage disparity between multiple cells operating across a coverage area of a wireless communications network by performing coverage shaping via an antenna at a transmission point. The operations include determining a disparity in signal coverage over the coverage area between a first cell and a second cell, the first cell and the second cell operating over the coverage area, wherein the first cell operates at a different frequency spectrum or frequency band from the second cell and wherein the network node determines the disparity in signal coverage by analyzing network data collected for the first and second cells. The operations further include determining when the disparity in signal coverage meets a set criterion; and when the disparity in signal coverage meets the set criterion, adjusting coverage shape of one of the first cell and the second cell over the coverage area to reduce the disparity, wherein adjusting of the coverage shape is performed by tilting signal coverage of the antenna at the transmission point.

In a fourth aspect of the disclosed system, a carrier contains the computer program according to the third aspect, wherein the carrier is one of an electronic signal, optical signal, radio signal or computer storage medium.

There are, proposed herein, various embodiments which address one or more of the issues disclosed herein. Certain embodiments may provide one or more of the following technical advantage(s). Cellular networks are becoming more complex having a multitude of different frequency layers or carriers, multiple different radio access technologies and different cell types. With the addition of any new radio access technology, there is a need for a support node. Further, based on the foregoing, radio frequency shaping is becoming more challenging. Hence, the disclosure describes a scheme in which the system is aware of the deployment of new radio access technologies. Also, the disclosure describes implementation of policies for the handling of network coverage taking into consideration the cellular coverage of support nodes and the new radio access technology in the decision-making process.

The new radio access technology aware cellular network inter-frequency coverage orchestrator as described is able to use intelligence gathered from the network, network topology and site data, to auto-detect the coverage disparity of an underlaying or overlaying cell per sector, assign intelligent bounds for radio frequency shaping via an antenna device, suggest a coverage improvement strategy for disparate overlay or underlay cell per sector and provide the opportunity for the self-organizing platform to improve the coverage of mismatched coverage parity sectors. In addition, it can apply a different but contextual optimization policy to sector-carriers or spectrum allocated to the new radio access technology in reference to the supporting existing technology cell, at the same time help maximize the coverage of the supporting existing technology cell. The solution is also able to auto adapt to network changes, such as network site growth or sector-carrier expansions. Using the optimization policy, goals and set antenna bounds, the self-organizing platform can aim to drive or achieve the contextual optimization goal set by the solution.

There are, proposed herein, various embodiments which address one or more of the issues disclosed herein. Certain embodiments may provide one or more of the following technical advantages:

Helps to obtain the best performance out of the cellular network by maximizing cellular footprint.

Is an enabler for better performance and user perception for existing and new radio technology.

Due to the maximization of coverage and improvement of the overlap between underlay and overlay cells, the technique enables better traffic load distribution and enables radio network features, such as carrier aggregation and 5G anchoring, to work more effectively.

Auto-detect the new radio access technology and supporting radio access technology cells.

Determine if there is a coverage disparity between/within the existing cells and the new radio access technology.

Measure the amount of disparity between the two technologies or cells of the same radio technology.

Determine and assign a coverage improvement contextual goal to the coverage disparity cells.

Empower a self-organizing network platform to take action to reach the determined goal.

Measure the change against the improvement goal.

Additionally, the solution can self-adapt a change in the cellular network infrastructure.

BRIEF DESCRIPTION OF THE DRAWINGS

The present disclosure may best be understood by referring to the following description and accompanying drawings that are used to illustrate embodiments of the present disclosure. In the drawings.

DETAILED DESCRIPTION

Figure 1:
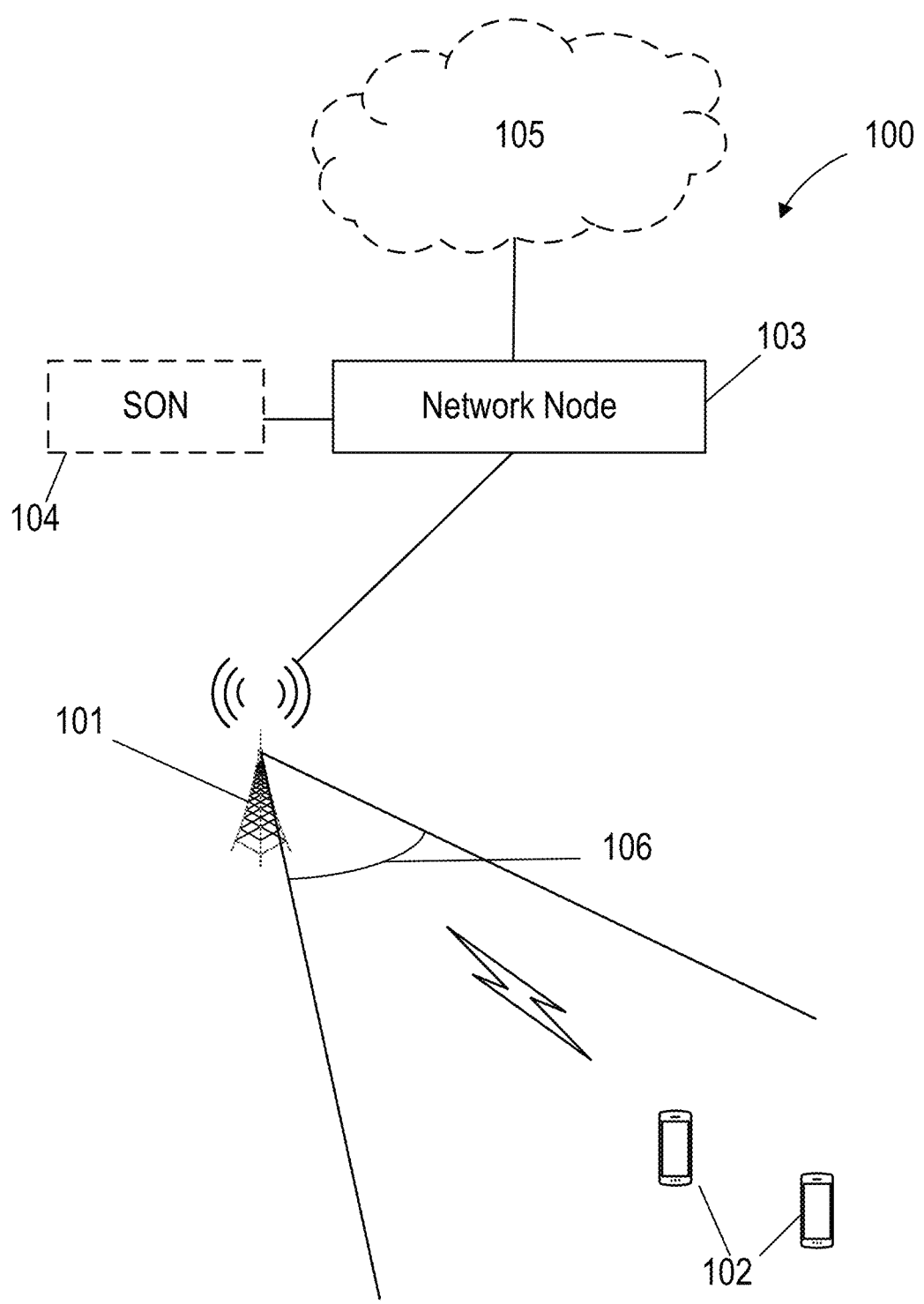
FIG. 1 illustrates a wireless communication network, according to some embodiments of the present disclosure.

The following description describes methods and apparatus for radio access technology aware cellular network inter-frequency coverage orchestrator. The orchestrator, among other things, is to define, manage, control and/or set policies for cellular network inter-frequency coverage. The following description describes numerous specific details such as operative steps, resource implementations, network structure, coverage areas pertaining to cells and/or sectors, types of radio access technology, and interrelationships of system components to provide a more thorough understanding of the present disclosure. It will be appreciated, however, by one skilled in the art that the embodiments of the present disclosure can be practiced without such specific details. In other instances, control structures, circuits, memory structures, and software instruction sequences have not been shown in detail in order not to obscure the present disclosure. Those of ordinary skill in the art, with the included descriptions, will be able to implement appropriate functionality without undue experimentation.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, model, or characteristic is described in connection with an embodiment, it is submitted that it is within the knowledge of one skilled in the art to effect such feature, structure, characteristic, or model in connection with other embodiments whether or not explicitly described.

Bracketed text and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in some embodiments of the present disclosure.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node. More generally, however, network nodes may represent any suitable device (or group of devices) capable, configured, arranged, and/or operable to enable and/or provide a wireless device with access to the wireless network or to provide some service to a wireless device that has accessed the wireless network.

Some of the embodiments contemplated herein apply to wireless communication technologies applicable to the 3$^{rd}$ Generation Partnership Project (3GPP), including LTE and 5G/NR. Some embodiments can apply to other older radio technology, as well as to new radio technologies being contemplated going forward. The disclosure describes the area of coverage as a cell of a cellular network. However, the area need not be limited to a cell and can apply to other coverage areas or designations.

FIG. 1 illustrates a wireless communication network 100 according to some embodiments of the present disclosure. The network 100 can at least partly be based on radio access technologies such as e.g. 3GPP Long Term Evolution (LTE), LTE-Advanced, Evolved Universal Terrestrial Radio Access Network (E-UTRAN), Universal Mobile Telecommunications Service (UMTS), Global System for Mobile (GSM)/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT and High Rate Packet Data (HRPD), just to mention some options. The network 100 may be suitable for providing radio communications meeting one or more of the criteria established by the Next Generation Mobile Networks Alliance for the 5th generation of mobile telecommunications standards (e.g., 5G/NR). In some embodiment, the communication network 100 can be a wireless cellular network.

The wireless communication network 100 comprises one or more radio access nodes. FIG. 1 only shows one radio access node 101, but the skilled person will appreciate that any number of radio access nodes may be provided. The radio access node 101 can be referred to as a base station, NodeB, evolved NodeB (eNB, or eNodeB), gNodeB, base transceiver station, Access Point Base Station (or just Access Point), base station router, Radio Base Stations (RBS), macro base station, micro base station, pico base station, femto base station, Home eNodeB, relay and/or repeater, beacon device or any other network node configured for communication with wireless devices over a wireless interface, depending on the radio access technology and terminology used. The functions of the radio access node 101 may be distributed across one or more physical nodes. For example, each radio access node may be divided logically into more than one unit, comprising one or more of the following: a centralized unit (CU), a distributed unit and a radio unit (RU), remote radio head (RRH) or transmission point (TP).

The radio access node 101 can serve one or more cells of the network 100. For purposes of description and explanation, the radio access node 101 discussion below references a coverage area, such as a sector. Hence, radio access node 101 is described as part of a cellular network having a coverage of at least one sector. Within a coverage area (such as a sector) 106, wireless devices 102 communicate with the radio access node 101 to provide services to users of the devices as is familiar to those skilled in the art. The radio access node 101 further communicates with a network node or nodes, such as network node 103, for co-ordination and control, and provides access to other parts of the network or to other external network(s) 105, such as the Internet.

FIG. 1 shows multiple wireless terminal device 102 in communication with the radio access node 101. A terminal device 102 can be referred as a user equipment (UE), mobile device, mobile terminal device, wireless terminal device, etc. Those skilled in the art will appreciate that wireless signals are transmitted between the radio access node 101 and the terminal device 102 using radio resources which are controlled by the network node 103. FIG. 1 shows one radio access node 101 to provide the coverage area for the terminal devices 102, but any number of radio access nodes may be present to provide service coverage to terminal devices 102.

Generally, a transmission coverage area from a transmission point, such as the radio access node 101, is commonly referred to as a cell. Although one cell may service a coverage area, in prevalent practice, multiple cells can cover a given coverage area (e.g., multiple cells covering a sector). The multiple cells associated with the radio access node 101 can be transmitted from one antenna or from multiple antennae. The multiple antennae can be co-located. In some instances, the different cells over the coverage area 106 can employ the same radio access technology, but are differentiated by different frequency spectrum or frequency bands. For example, in carrier aggregation, the different cells may transmit carriers at different frequencies and, in some instances, the carrier frequencies may fall into different frequency spectrum or bands.

In some instances, the different cells over a coverage area 106 can deploy different radio access technologies, such as a cell providing LTE service and another cell providing 5G/NR service. Thus, a given coverage area 106 may have more than one cell providing signal coverage, such as where one cell provides LTE access and, a second cell provides 5G/NR service. Typically, a newer service, such as 5G/NR, operates at different frequency spectrum or bands from the legacy service. As will be described below, one issue of concern in deploying different spectrum/bands and/or different radio access technologies is maintaining adequate signal coverage by both cells over the overlapped coverage area.

FIG. 1 also illustrates a Self-Organizing Network (SON) 104 for collecting various network data. SONs are a critical enabler supporting the widespread deployment of mobile broadband technologies, and can provide functionalities beyond data collection, such as self-configuring, self-optimizing, and self-healing functionalities. SON 104 may use an optimization manager to automate network optimization where the SON 104 makes the most use of already available functionalities. Thus, SON 104 can be used for network data collection, as well as optimizing operational parameters of the network or parts of the network, such as the coverage area 106. The SON 104 is shown with a dashed line to signify that it is optional and may be used or not used. In some embodiments, the network node 103 may provide the data collection function. In some embodiments the SON 104 is part of the network node 103.

As to the network node 103, it can be any node in the network 100. It may be a radio network control node, a core node within the network 100, a distributed node, a cloud node, etc. Thus, network node 103 illustrates a location within network 100 for practicing the various described embodiments.

Figure 2:
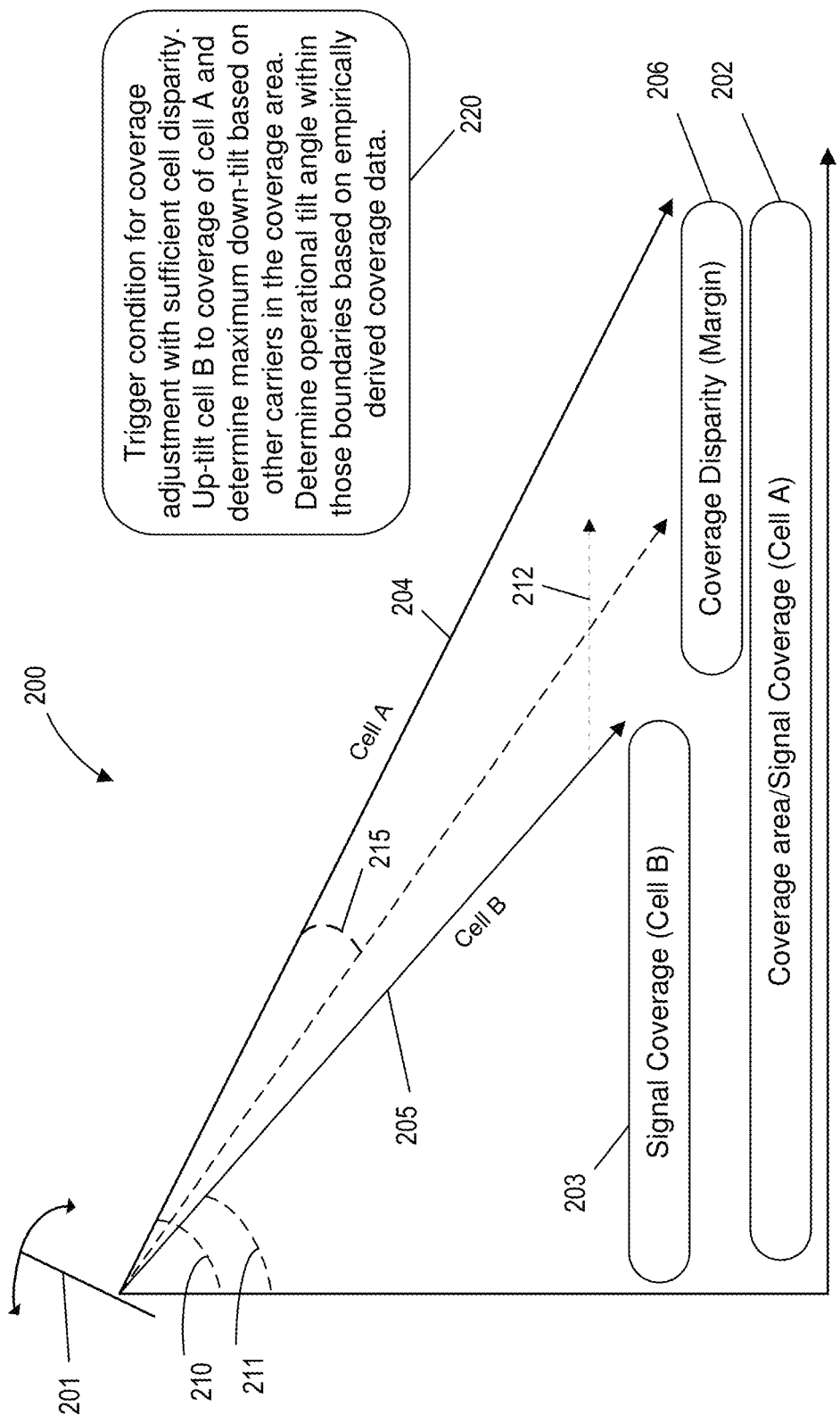
FIG. 2 illustrates a vertical cross-sectional diagram of a coverage area for a transmission point of an antenna having more than one cell, according to some embodiments of the present disclosure.

FIG. 2 illustrates a vertical cross-sectional diagram 200 of a coverage area for a transmission point of an antenna 201 having more than one cell, according to some embodiments of the present disclosure. The diagram 200 is a cross-section across a coverage area, such as coverage area 106, in which the vertical axis depicts height, with the antenna 201 at the top. The horizontal axis depicts the horizontal distance away from the point of transmission. At the antenna 201 location, a diagonal line 204 depicts an acceptable signal coverage boundary for one cell, noted in the diagram as cell A. Thus, the horizontal spatial coverage from the antenna location for cell A is coverage area 202. As shown, line 204 has a tilt angle 210 in reference to the vertical axis at the antenna.

A second diagonal line 205 depicts an acceptable signal coverage boundary for a second cell, noted in the diagram as cell B. The horizontal spatial coverage from the antenna location for cell B is coverage area 203. As shown, line 205 has a tilt angle 211 in reference to the vertical axis at the antenna. The diagonal lines 204 and 205 illustrate relative coverage areas between the two cells A and B. The lines 204, 205 illustrate cell boundaries in the example, but can represent other quantities, such as average signal strength, etc. What is to note is the depiction of disparity in the signal coverage between cell A and cell B. Thus, a coverage disparity (e.g., margin) 206 exists between the signal coverage areas of cell A and cell B.

A typical cause of this coverage disparity is the transmission of signals at different frequency spectrum or frequency bands for the two cells having a same point of transmission, which is antenna 201 in the diagram. This inter-frequency coverage disparity can also occur when the two cells are deployed using different radio access technology. Different radio access technologies tend to use different frequency spectrum or frequency bands. For example, cell A can represent the use of LTE radio access technology, while cell B can represent the use of 5G/NR radio access technology. Generally, 5G/NR frequencies are much higher than LTE frequencies and, because of the higher frequencies, 5G/NR signal transmissions have less penetration in the atmosphere versus LTE signal transmissions.

The antenna 201 is shown as one antenna, however, antenna 201 may comprise multiple antennae co-located at the transmission point. Thus, the transmission of signals for cell A and cell B can be from the same antenna or from different antennae that are co-located at the transmission point. The antenna for cell A and the antenna for cell B (whether same or different antenna) are simply described as antenna 201 herein. Antenna 201 can be an antenna array, such that the propagation pattern emanating from the antenna can be steered by the array. In that fashion, the antenna 201 propagation pattern can be electrically tilted (up-tilt and down-tilt) to adjust the angle 210 and/or angle 211 individually to change the coverage area 202 and/or 203 for one or both of the cells.

As noted in block 220 in FIG. 2, one trigger condition for coverage adjustment can be due to sufficient cell disparity. A set criterion can establish a condition that warrants adjustment of one or both cells to reduce the margin area 206. One such criterion can be the physical distance of the margin 206 separating the two cell boundaries. As an example, if cell A boundary line 204 reaches a distance of 10 km along the ground (e.g., the horizontal axis on the drawing), the set criterion can be less than 8 km. In this example, if cell B boundary line 205 had a 6 km range along the ground, it would meet the set criterion for requiring adjustment. Note that this is an example only and other objective criteria can determine when to require an adjustment to reduce the coverage disparity 206.

As further noted in block 220, when meeting the set criterion, an adjustment involves up-tilting the angle of cell B to the coverage of cell A (line 205 to line 204), determining a maximum allowable down-tilt for cell B (shown by dotted line 212), and finding an operational tilt angle or a range of angles for cell B that resides between the cell A boundary 204 and the maximum allowable down-tilt angle 215 of line 212. Thus, in the diagram 200, the adjustment procedure up-tilts the cell B boundary line 205 to a location within angle 215. The antenna 201 functions to provide the up-tilt of the cell B signal propagation to the desired tilt angle, which reduces the coverage disparity between cell A and cell B. In some embodiments, cell B may operate having a tilt angle within a range of angle 215.

A number of options are available to determine the maximum allowable down-tilt (e.g., angle 215). As noted in block 220, one option is to use empirically derived coverage data to choose the maximum allowable down tilt angle. For example, the network can evaluate the carriers operating within cell A to determine a quantified up-tilt and ensure that no carrier falls below the maximum allowable down-tilt. By having set the maximum allowable down-tilt, no carrier should operate below the boundary 212.

Thus, FIG. 2 shows a high-level view of what the above described solution is trying to achieve. In one application, an intent of a solution is to maximize the coverage of the 5G/NR radio access technology cell with respect to the supporting radio access technology cell (e.g., LTE). The solution sets the bounds, policy and utilizes the self-organizing platform (e.g., SON) to offer the opportunity to increase coverage via radio frequency shaping using an antenna device. The SON 104, or some other equivalent platform, provides the platform for data collection, analysis, antenna adjustment and coverage shaping. The SON platform can also provide further optimization to improve operational parameters of cell B after the initial adjustment.

Figure 3:
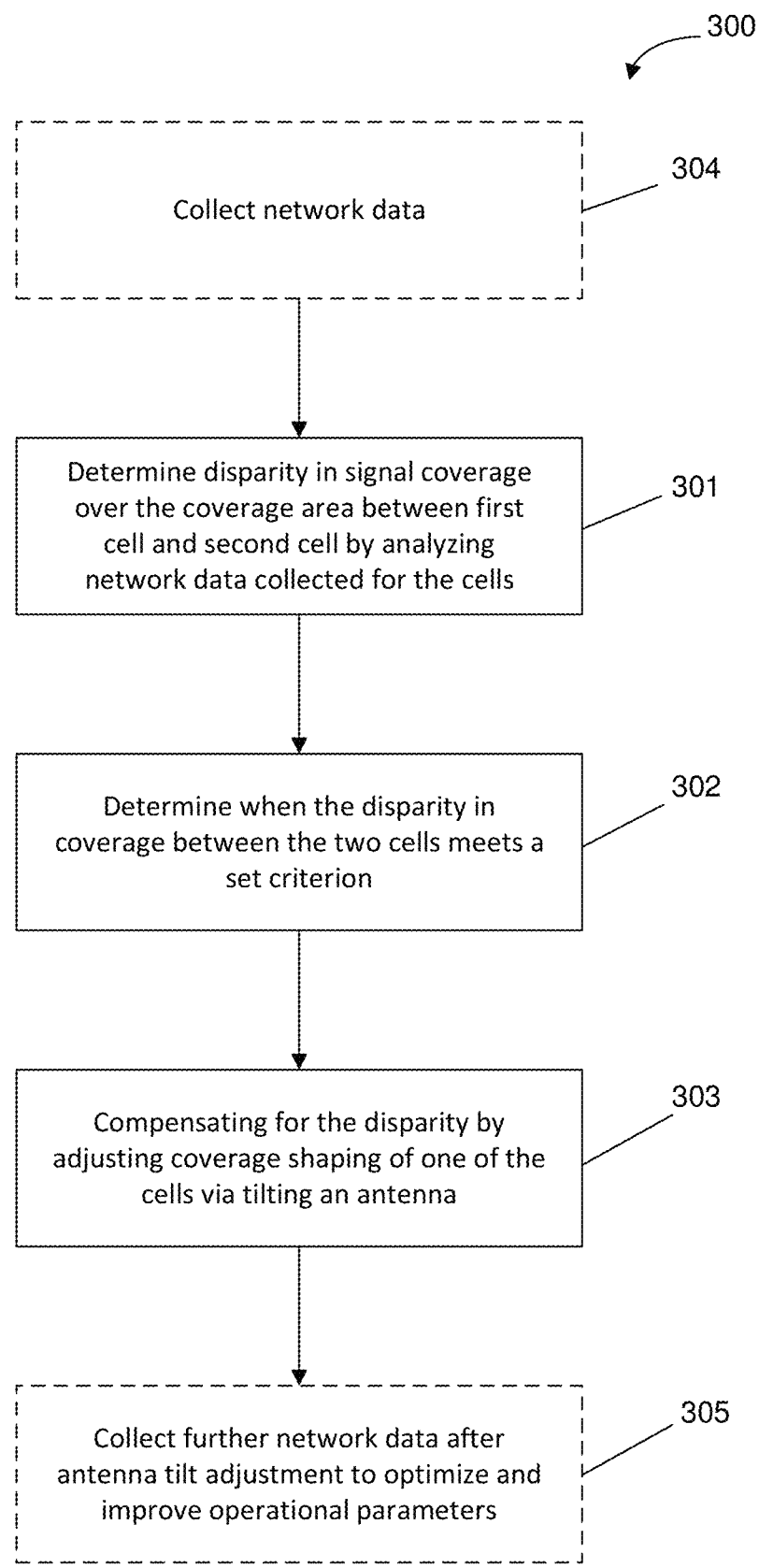
FIG. 3 illustrates a flow diagram for a method of operation, according to some embodiments of the present disclosure.

FIG. 3 illustrates a flow diagram 300 for a method of operation, according to some embodiments of the present disclosure. FIG. 3 is better understood when viewed in context of the diagram 200 of FIG. 2. At operation 301, the method determines a disparity 206 in signal coverage over the coverage area between a first cell (e.g., cell A) and a second cell (e.g., cell B), the first cell and the second cell operating over the coverage area 202, wherein the first cell operates at a different frequency spectrum or frequency band from the second cell and wherein the network node 103 determines the disparity 206 in signal coverage by analyzing network data collected for the first and second cells.

At operation 302, the network node determines when the disparity in signal coverage meets a set criterion. As noted above in reference to FIG. 2, one such set criterion can be the physical distance of the margin 206 separating the two cell boundaries. At operation 303, when the disparity in signal coverage meets the set criterion, the network node adjusts the coverage shape of one of the cells to reduce the disparity, where the adjusting of the coverage shape is performed by tilting the signal coverage of the antenna at the transmission point. One technique is to determine the maximum allowable down-tilt angle and prevent a signal (e.g., carrier signal) from exceeding the down tilt.

FIG. 3 further illustrates two other optional operations. Because the network node uses data collected by the network, such as by the SON platform, the network node can also act to actively collect data that may be required to perform operations 301-303. In that instance, the network node and/or the SON platform can perform the required data collection by performing operation 304 to make the determination of coverage disparity and the necessary assessment to provide the adjustment as detailed by operations 301-303.

At operation 305, the network node and/or the SON platform can collect further data after the initial antenna tilt adjustment to optimize and improve operational parameters. As an example, determining the maximum allowable down-tilt and operational tilt-angle range for a cell, the follow up data collection may determine that the up-tilt of cell B of FIG. 2 may interfere with the operation of neighbor sectors. In such instance the down-tilt angle for cell B may need to be increased and/or operational parameters adjusted in order to reduce the interference.

Figure 4:
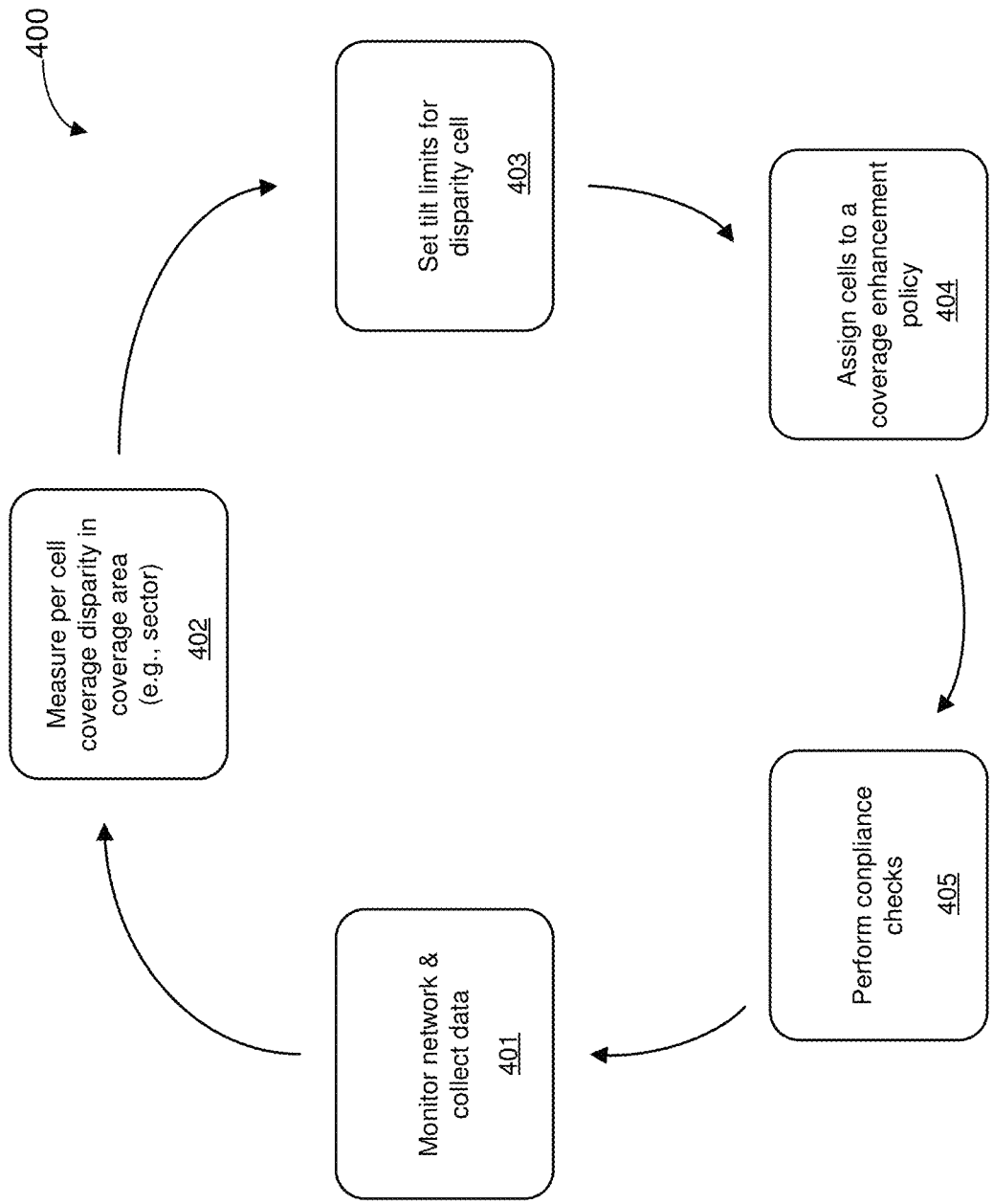
FIG. 4 illustrates another flow diagram for a method of operation, according to some embodiments of the present disclosure.

FIG. 4 illustrates another flow diagram 400 for a method of operation, according to some embodiments of the present disclosure. At operation 401, the method monitors the network and collects data, similar to that performed by operation 304. At operation 402, the method determines cell coverage disparity for the coverage area, similar to that performed by operation 302. At operation 403, the method sets the tilt limits, similar to that performed by operations 302-303. At operation 404, the method assigns the cells to a coverage enhancement policy and, at operation 405, further performs compliance checks, both operations 404-405 are similar to that performed by operation 305.

Figure 5:
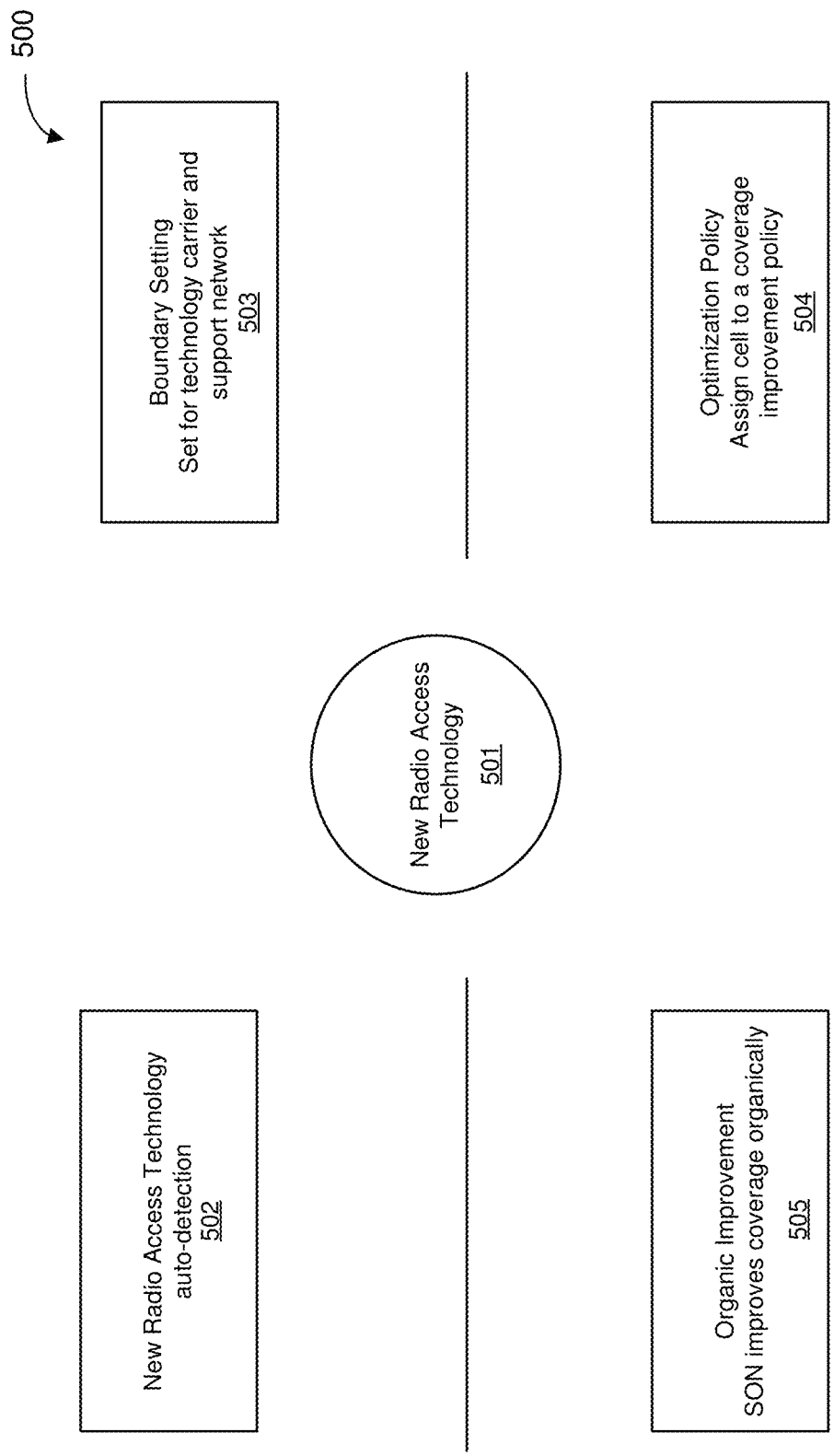
FIG. 5 illustrates a diagram for implementing a new radio access technology, according to some embodiments of the present disclosure.

FIG. 5 illustrates a diagram 500 for implementing a new radio access technology, according to some embodiments of the present disclosure. FIG. 5 illustrates a situation when a wireless communication system introduces a new radio access technology 501. The deployment may be to a localized area, such as the radio access node 101 of FIG. 1. The deployment would be on top of an existing radio access technology. In some embodiments, the new radio access technology can be 5G/NR, which is deployed on the legacy LTE technology. The 5G/NR and LTE radio access technologies are provided as examples and the deployment of the new radio access technology and legacy radio access technology need not be limited to these two technologies.

The network node 103 and/or the SON 104 are configured to auto-detect the deployment of the new radio access technology (either locally or widespread) as shown in block 502. Once detected, the configured system can detect, by analysis of the collected network data relating to the cells, the disparity in the coverage area between the cells of the two access technologies and perform the methods described earlier in reference to FIGS. 2 and 3 to perform the boundary setting for the carriers of the new radio access technology (assuming that the new technology has the smaller coverage area), as shown in block 503. Once set, the system can employ an optimization policy on the adjusted cell, as well as the existing cell of the legacy radio access technology, and assign one or both cells to a coverage improvement policy, as shown in block 504. Using the policy, the SON platform can monitor the on-going performance and make organic improvements to one or both cells as required by the policy, as shown in block 505.

Figure 6:
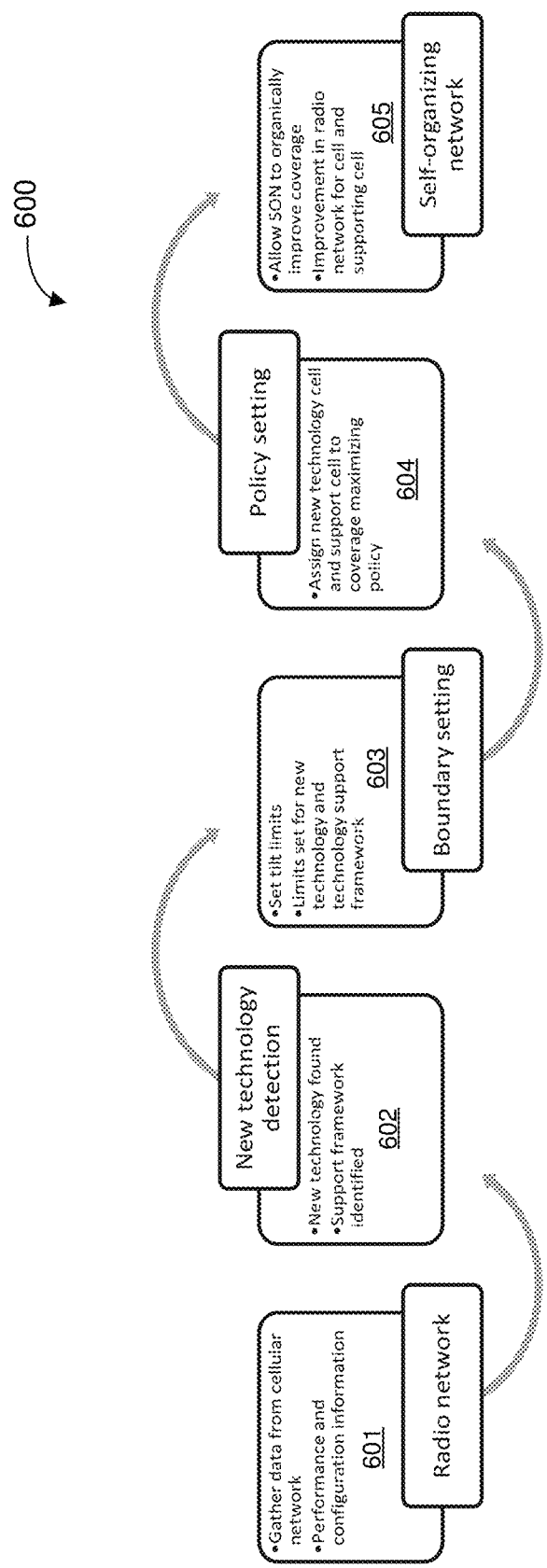
FIG. 6 illustrates a flow diagram for implementing a new radio access technology, according to some embodiments of the present disclosure.

FIG. 6 illustrates a flow diagram 600 for implementing a new radio access technology, according to some embodiments of the present disclosure. FIG. 6 shows one flow diagram for the implementation of the blocks 501-505 of FIG. 5. At operation 601, prior to the deployment of the new radio access technology, the system (e.g., network node 103 and/or SON 104) gathers data from the wireless network to assess performance and configuration information pertaining to the legacy radio access technology. At operation 602, the system auto-detects the new radio access technology and identifies the support network required for the deployment. At operation 603, the system determines the boundary limits (e.g., the tilt boundaries) for the new technology, in relation to the legacy technology, utilizing the before-mentioned technique of tilt angle adjustment. At operation 604, the system sets a policy of operation for the new technology and assigns the new cell based on the set policy. At operation 605, the SON continually monitors the performance of the cells and makes needed adjustments to organically (e.g., smooth transition, without abruptly forcing the change) improve the performance of the radio network.

Figure 7:
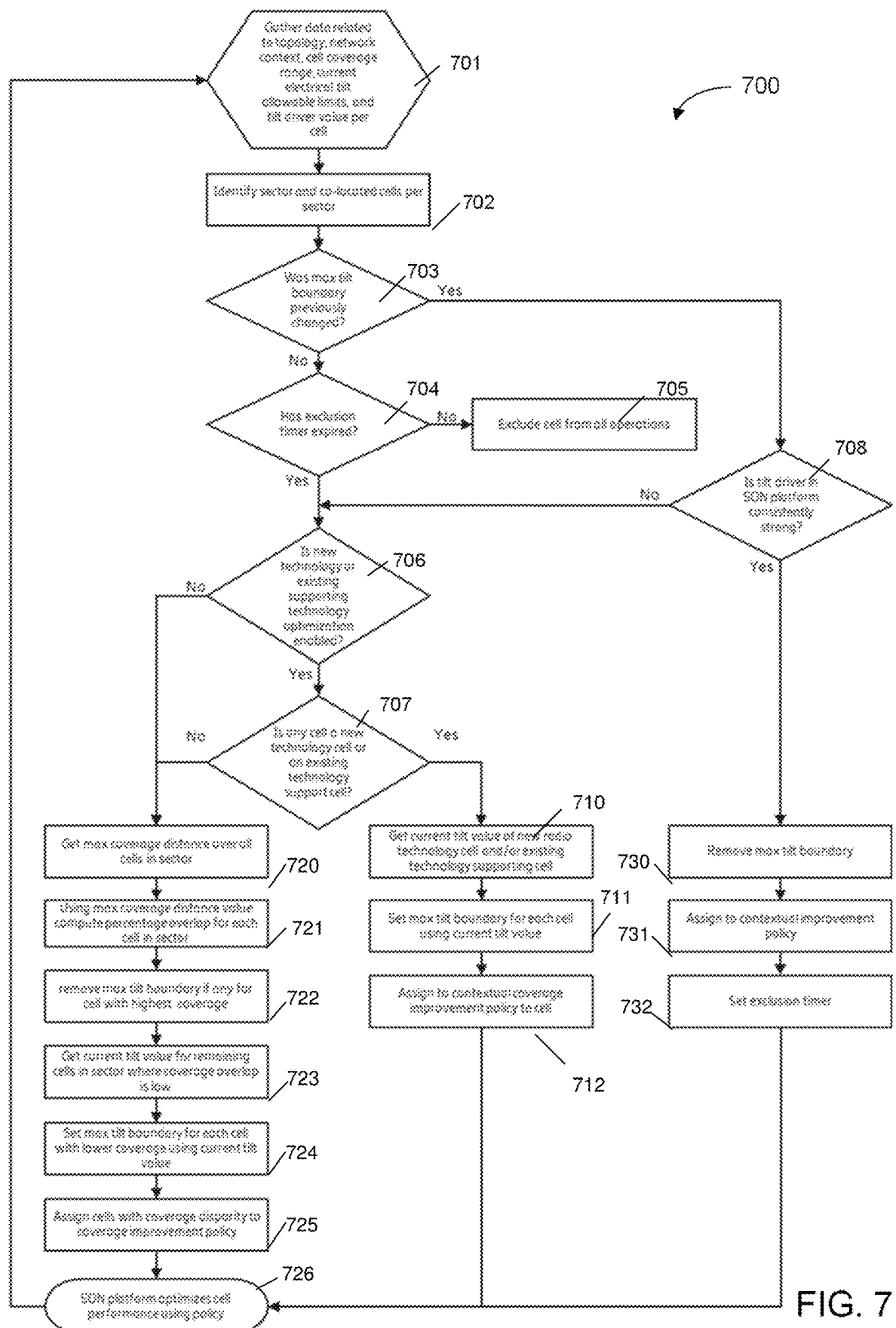
FIG. 7 illustrates a more detailed flow diagram for another method of operation, according to some embodiments of the present disclosure.

FIG. 7 illustrates a more detailed flow diagram for another method of operation, according to some embodiments of the present disclosure. FIG. 7 is a more detailed flowchart 700 to further describe the operation of a system that includes the network node 103 and SON 104 to provide the tilt angle adjustment procedure described earlier in the description. The overview of the flowchart 700 are as follows:

1. The first procedure involves gathering data essential to the decision making of the solution. This includes topology, network context, cell coverage range, current electrical tilt, allowable tilt limits, and tilt driver value per cell (block 701). This procedure can use the SON platform as earlier noted.

2. The next procedure helps identify the overlay and underlay cells per sector (block 702).

3. Following that, are the procedures that help track if the solution had previously worked on the candidate cell and if the cell should be excluded from the coverage improvement, since the dynamic network adaptation component of the solution is working on the same cell (block 703). When using an exclusion timer, the procedure checks if the timer has expired (block 704). The exclusion timer, when used, sets an exclusion period after performing an adjustment (such as the tilt angle adjustment), during which exclusion period the timer is operative, in order to refrain from making further adjustments to the cell. This exclusion period allows time for data collection, policy setting, and operational parameter improvement to complete the assessment of the various changes, before subjecting the cell(s) to another adjustment. The time period of the exclusion is dependent on the system and can be set to days, weeks, months, etc. When the exclusion time is in force, the cell in question is exempt from the adjustment process (block 705).

4. There is another outer loop (via block 708) that monitors for network changes and that determines if any actions must be taken on the candidate cell due to that network change (block 708). If that condition is determined to be the case, an appropriate action is taken to ensure that the candidate cell adapts to the network change (blocks 730-731). During this portion of the process the candidate cell is excluded from the coverage optimization process by setting the exclusion timer (block 732).

5. If the candidate cell passes the criteria defined in #3 above, the method checks if the new technology or existing supporting technology optimization is enabled (block 706). If not enabled, then the procedure follows the path of performing operations of blocks 720-725. If the optimization is enabled at decision operation of block 706, the procedure reaches another decision operation (block 707). Note that the operation of the decision operation at block 707 applies, only if the optimization is already enabled at block 706. Depending on the decisions made at operations of blocks 706 and 707, the procedure follows one of two paths (blocks 710-712 or blocks 720-726) to handle the new cell under special handling or to use existing disparity evaluation.

In the one path, the candidate cell traverses a path where its coverage is accessed in relation to the highest coverage distance of underlay or overlay cell within the same sector. The outcome of this assessment sets the higher bounds for the electrical tilt and assigns coverage improvement policy to the candidate cell (blocks 720-725). This information is passed onto the self-organizing network platform for further operations (block 726). In the other path, the candidate cell traverses the tilt adjustment path (blocks 710-712). This information is also passed on to the SON platform (block 726).

The description of each block of FIG. 7 are as follows:

701—Gather data related to topology, network context, cell coverage range, current electrical tilt allowable limits, and tilt driver value per cell.

702—Identify sector and co-located cells per sector.

703—Was max tilt boundary previously changed?

704—Has exclusion timer expired?

705—Exclude cell from all operations.

706—Is new technology or existing supporting technology optimization enabled?

707—Is any cell a new technology cell or an existing technology support cell?

708—Is tilt driver in SON platform consistently strong?

Figure 8:
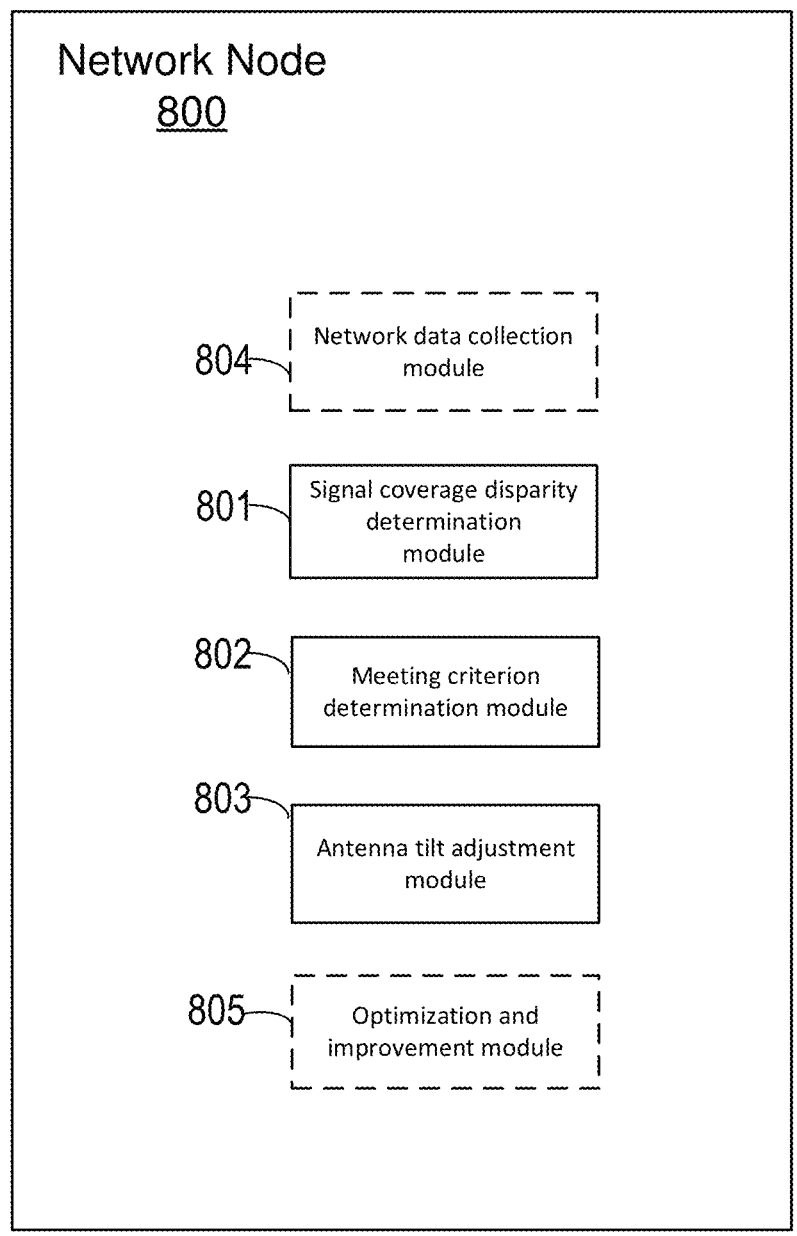
FIG. 8 illustrates a network node, according to some embodiments of the present disclosure.

710—Get current tilt value of new radio technology cell and/or existing technology supporting cell.
711—Set max tilt boundary for each cell using current tilt values.
712—Assign to contextual coverage improvement policy to cell.
720—Get max coverage distance over all cells in sector.
721—Using max coverage distance value compute percentage overlap for each cell in sector.
722—Remove max tilt boundary if any for cell with highest coverage.
723—Get current tilt value for remaining cells in sector where coverage overlap is low.
724—Set max tilt boundary for each cell with lower coverage using current tilt value.
725—Assign cells with coverage disparity to coverage improvement policy.
726—SON platform optimizes cell performance using policy.
730—Remove max tilt boundary
731—Assign to contextual improvement policy
732—Set exclusion timer FIG. 8 illustrates a network node 800, according to some embodiments of the present disclosure. The network node 800 can implement the functions of the system and the methods/procedures described in this disclosure. The network node 800 can comprise or be part of the network node 103 and/or SON 104, or be implemented in another network node of the wireless communication network 100.

The network node 800 comprises a signal coverage disparity determination module 801, a meeting criterion determination module 802, and an antenna tilt adjustment module 803. The network node 800 may also contain a network data collection module 804 and/or an optimization and improvement module 805. These last two modules may be optional modules. The signal coverage disparity determination module 801 can perform operations corresponding to the operation 301 of method 300 to collect data. The meeting criterion determination module 802 can perform operations corresponding to the operation 302 to determine if the disparity in the coverage meets the set criterion. The antenna tilt adjustment module 803 can perform operations corresponding to the operation 303 to adjust the coverage shaping via antenna tilt angle. The network data collection module 804 and the optimization and improvement module 805 can perform operations corresponding to operations 304 and 305, respectively.

In some embodiments, the modules 801-805 can be provided as a computer program product, or software, that can include a machine-readable medium having stored thereon instructions, which can be used to program a computer system (or other electronic device) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In some embodiment, the modules of the network node 800 are implemented in software. In other embodiments, the modules of the network node 800 are implemented in hardware. In further embodiments, the modules of the network 800 are implemented in a combination of hardware and software. In some embodiments, the computer program can be provided on a carrier, where the carrier is one of an electronic signal, optical signal, radio signal or computer storage medium.

Figure 9:
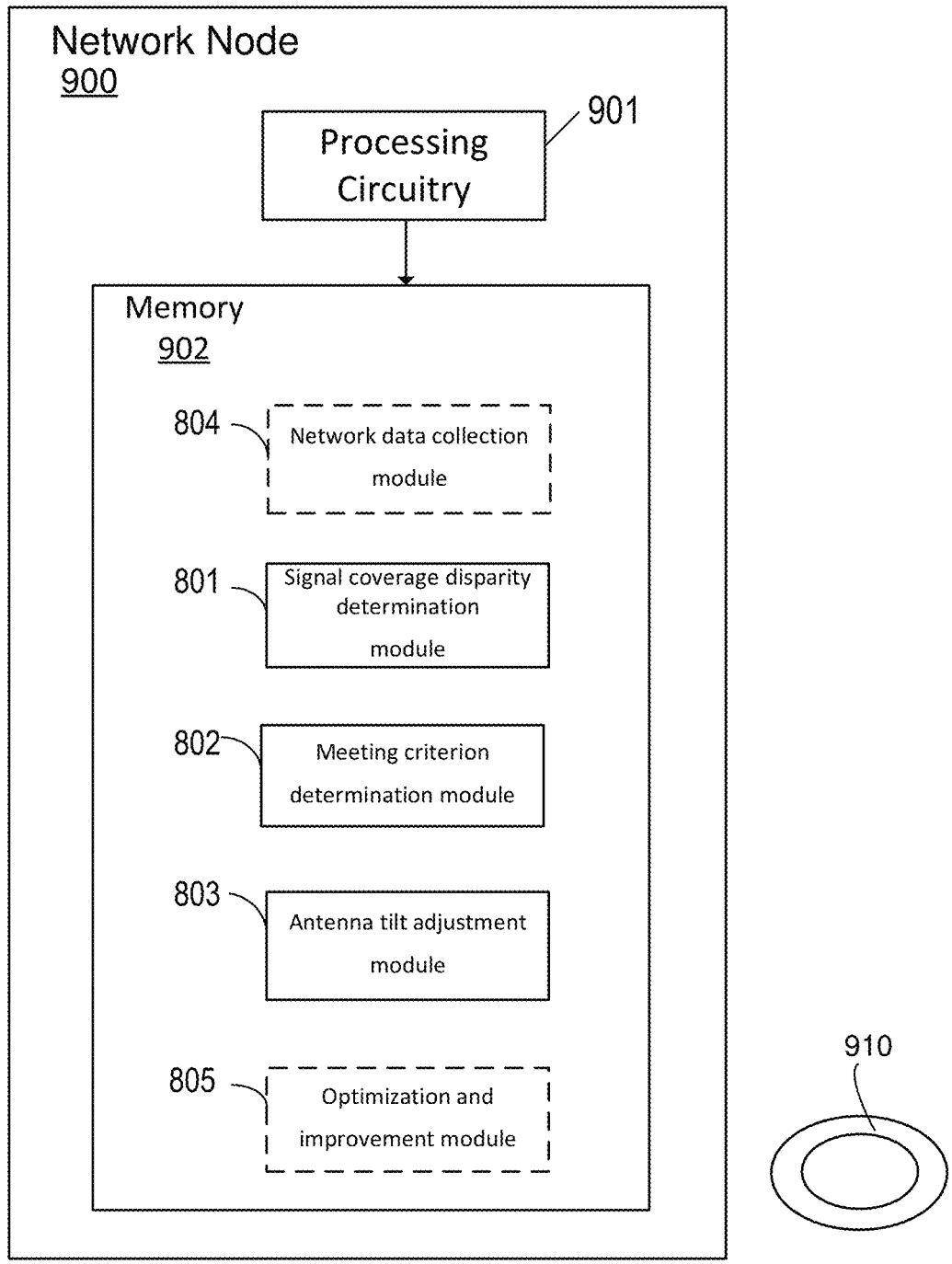
FIG. 9 illustrates another network node, according to some embodiments of the present disclosure.

FIG. 9 illustrates another network node, according to some embodiments of the present disclosure. The network node 900 can implement the functions of the system and the methods/procedures described in this disclosure. The network node 900 can comprise or be part of the network node 103 and/or SON 104, or be implemented in another network node of the wireless communication network 100. The network node 900 can be configured to implement the modules 801-805 of FIG. 8, wherein the instructions of the computer program for providing the functions of modules 801-805 reside in memory 902.

The network node 900 comprises processing circuitry (such as one or more processors) 901 and a non-transitory machine-readable medium, such as the memory 902. The processing circuitry 901 provides the processing capability. The memory 902 can store instructions which, when executed by the processing circuitry 901, are capable of configuring the network node 900 to perform the methods described in the present disclosure. The memory can be a computer readable storage medium, such as, but not limited to, any type of disk 910 including magnetic disks, optical disks, CD-ROMs, and magnetic-optical disks, read-only memories (ROMs), random access memories (RAMs), EPROMs, EEPROMs, magnetic or optical cards, or any type of media suitable for storing electronic instructions. Furthermore, a carrier containing the computer program instructions can also be one of an electronic signal, optical signal, radio signal or computer storage medium.

Figure 10:
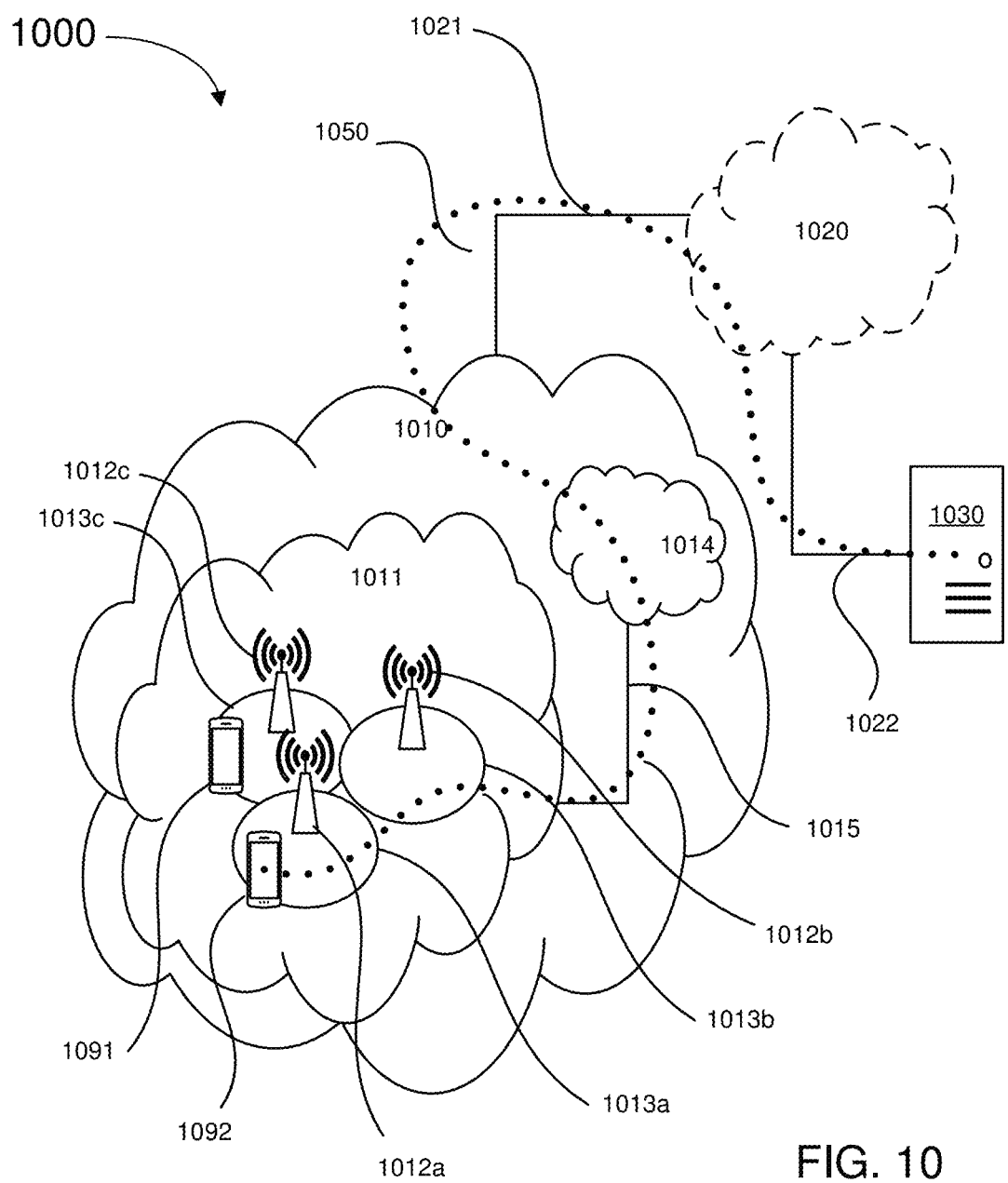
FIG. 10 illustrates a communication system, according to some embodiments of the present disclosure.

With reference to FIG. 10, in accordance with some embodiment, a communication system 1000 includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first terminal device 1091 located in coverage area 1013c is configured to wirelessly connect to, or be paged by, the corresponding base station 1012c. A second terminal device 1092 in coverage area 1013a is wirelessly connectable to the corresponding base station 1012a. While a plurality of terminal devices 1091, 1092 are illustrated in this example, the disclosed embodiments are equally applicable to a situation where a sole terminal device is in the coverage area or where a sole terminal device is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 enables connectivity between the connected terminal devices 1091, 1092 and host computer 1030. The connectivity may be described as an over-the-top (OTT) connection 1050. Host computer 1030 and the connected terminal devices 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected terminal device 1091. Similarly, base station 1012 need not be aware of the future routing of an outgoing uplink communication originating from the terminal device 1091 towards the host computer 1030.

The various techniques described in the present disclosure can be practiced in one or more network nodes of communication system 1000, including core network 1014 and base station 1012a, 1012b, 1012c.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Furthermore, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

What is claimed is:

1. A method at a network node for compensating for inter-frequency coverage disparity between multiple cells having a same transmission point and operating across a coverage area of a wireless communications network by performing coverage shaping via an antenna at the transmission point, the method comprising:

determining a disparity in signal coverage over the coverage area between a first cell and a second cell, the first cell having a first signal coverage area from the transmission point operating over the coverage area and the second cell having a second signal coverage area from the transmission point operating over the coverage area, wherein the disparity in signal coverage is due to inter-frequency coverage disparity from the first cell operating at a different frequency spectrum or frequency band from the second cell and wherein the network node determines the disparity in signal coverage by analyzing network data collected for the first and second cells;

in response to determining the disparity in signal coverage, determining a physical distance of a margin separating boundaries of the first signal coverage area and the second signal coverage area meets a set criterion; and adjusting signal coverage boundary of one of the first cell and the second cell over the coverage area to reduce the margin by tilting the antenna at the transmission point.

2. The method according to claim 1, wherein the adjusting the signal coverage boundary is performed by tilting the antenna for one of the first cell and second cell having less signal coverage over the coverage area than the cell having more signal coverage.

3. The method according to claim 2, wherein the first cell operates utilizing a first radio access technology and the second cell operates utilizing a second radio access technology.

4. The method according to claim 3, wherein the one of the first cell and second cell having less signal coverage initially over the coverage area operates utilizing $5^{th}$ Generation (5G)/New Radio (NR) radio access technology and wherein the cell having more signal coverage over the coverage area operates utilizing Long Term Evolution (LTE) radio access technology.

5. The method according to claim 1, wherein the adjusting the signal coverage boundary is performed by determining an antenna tilt angle for one of the first cell and the second cell having higher signal coverage area over the coverage area, using the tilt angle of the cell having the higher signal coverage area as a reference tilt angle, determining a maximum down-tilt angle from the reference tilt angle for the other cell, and setting an antenna tilt angle for the other cell between the reference tilt angle and the maximum down-tilt angle.

6. The method according to claim 5, further comprising determining the maximum down-tilt angle based on signal coverage of multiple carriers in the coverage area.

7. The method according to claim 5, further comprising collecting the network data associated with the operation of the first cell and the second cell utilizing a Self-Organizing Network (SON) associated with the wireless communications network.

8. The method according to claim 7, comprising collecting further network data associated with the operation of the first cell and the second cell after setting the antenna tilt angle; and adjusting operational parameters, based on the further network data, to further improve operational parameters for operating the other cell.

9. A network node to compensate for inter-frequency coverage disparity between multiple cells having a same transmission point and operating across a coverage area of a wireless communications network by performing coverage shaping via an antenna at the transmission point, the network node comprising:

a processor; and a memory comprising instructions which, when executed by the processor, cause the network node to:

determine a disparity in signal coverage over the coverage area between a first cell and a second cell, the first cell having a first signal coverage area from the transmission point operating over the coverage area and the second cell having a second signal coverage area from the transmission point operating over the coverage area, wherein the disparity in signal coverage is due to inter-frequency coverage disparity from the first cell operating at a different frequency spectrum or frequency band from the second cell and wherein the network node determines the disparity in signal coverage by analyzing network data collected for the first and second cells;

in response to determination of the disparity in signal coverage determine a physical distance of a margin separating boundaries of the first signal coverage area and the second signal coverage area meets a set criterion; and adjust signal coverage boundary of one of the first cell and the second cell over the coverage area to reduce the margin by tilting the antenna at the transmission point.

10. The network node according to claim 9, wherein to adjust the signal coverage boundary further comprises, the network node to tilt the antenna for one of the first cell and second cell having less signal coverage over the coverage area than the other cell.

11. The network node according to claim 10, wherein the first cell to operate utilizing a first radio access technology and the second cell to operate utilizing a second radio access technology.

12. The network node according to claim 11, wherein the one of the first cell and second cell having less signal coverage initially over the coverage area to operate utilizing 5$^{th}$ Generation (5G)/New Radio (NR) radio access technology and wherein the cell having more signal coverage over the coverage area to operate utilizing Long Term Evolution (LTE) radio access technology.

13. The network node according to claim 9, wherein to adjust the signal coverage boundary further comprises, the network node to determine an antenna tilt angle for one of the first cell and the second cell having higher signal coverage area over the coverage area, use the tilt angle of the cell having the higher signal coverage area as a reference tilt angle, determine a maximum down-tilt angle from the reference tilt angle for the other cell, and set an antenna tilt angle for the other cell between the reference tilt angle and the maximum down-tilt angle.

14. The network node according to claim 13, wherein the network node to further determine the maximum down-tilt angle based on signal coverage of multiple carriers in the coverage area.

15. The network node according to claim 13, wherein the network node to further collect the network data associated with the operation of the first cell and the second cell utilizing a Self-Organizing Network (SON) associated with the wireless communications network.

16. The network node according to claim 15, wherein the network node to collect further network data associated with the operation of the first cell and the second cell after setting the antenna tilt angle; and to adjust operational parameters, based on the further network data, to further improve operational parameters to operate the other cell.

17. A non-transitory computer readable storage medium comprising instructions which, when executed by a processor, are capable of causing a network node for compensating for inter-frequency coverage disparity between multiple cells having a same transmission point and operating across a coverage area of a wireless communications network by performing coverage shaping via an antenna at the transmission point, to perform operations comprising:

determining a disparity in signal coverage over the coverage area between a first cell and a second cell, the first cell having a first signal coverage area from the transmission point operating over the coverage area and the second cell having a second signal coverage area from the transmission point operating over the coverage area, wherein the disparity in signal coverage is due to inter-frequency coverage disparity from the first cell operating at a different frequency spectrum or frequency band from the second cell and wherein the network node determines the disparity in signal coverage by analyzing network data collected for the first and second cells;

in response to determining the disparity in signal coverage, determining a physical distance of a margin separating boundaries of the first signal coverage area and the second signal coverage area meets a set criterion; and adjusting signal coverage boundary of one of the first cell and the second cell over the coverage area to reduce the margin by tilting the antenna at the transmission point.

18. The non-transitory computer readable storage medium according to claim 17, wherein the instructions further perform operations comprising: adjusting the signal coverage boundary by determining an antenna tilt angle for one of the first cell and the second cell having higher signal coverage area over the coverage area, using the tilt angle of the cell having the higher signal coverage as a reference tilt angle, determining a maximum down-tilt angle from the reference tilt angle for the other cell, and setting an antenna tilt angle for the other cell between the reference tilt angle and the maximum down-tilt angle.

19. The non-transitory computer readable storage medium according to claim 18, wherein the instructions further perform operations comprising, collecting the network data associated with the operation of the first cell and the second cell utilizing a Self-Organizing Network (SON) associated with the wireless communications network.

20. The non-transitory computer readable storage medium according to claim 18 wherein the instructions further perform operations being aware that the first cell operates utilizing a first radio access technology and the second cell operates utilizing a second radio access technology.

* * * * *